(12) United States Patent
Wang et al.

(10) Patent No.: US 9,904,137 B1
(45) Date of Patent: Feb. 27, 2018

(54) ELECTROCHROMIC MATERIALS AND FABRICATION METHODS

(71) Applicant: Clearist, Inc., Campbell, CA (US)

(72) Inventors: Zhongchun Wang, Sunnyvale, CA (US); Nelson R. Holcomb, Morgan Hill, CA (US); Paul Phong Nguyen, San Jose, CA (US)

(73) Assignee: Clearist, Inc., Campbell, CA (US)

( * ) Notice: Subject to any disclaimer, the term of this patent is extended or adjusted under 35 U.S.C. 154(b) by 466 days.

(21) Appl. No.: 14/465,800

(22) Filed: Aug. 21, 2014

Related U.S. Application Data

(60) Provisional application No. 61/868,319, filed on Aug. 21, 2013.

(51) Int. Cl.
*B32B 17/06* (2006.01)
*B32B 15/04* (2006.01)
*G02F 1/15* (2006.01)
*C23C 2/04* (2006.01)

(52) U.S. Cl.
CPC .............. *G02F 1/1523* (2013.01); *C23C 2/04* (2013.01)

(58) Field of Classification Search
USPC .......................... 428/426, 428, 432, 434, 688
See application file for complete search history.

(56) References Cited

U.S. PATENT DOCUMENTS

| | | | | |
|---|---|---|---|---|
| 6,005,705 A | * | 12/1999 | Schmidt | C08G 77/46 252/519.31 |
| 8,780,432 B1 | | 7/2014 | Nguyen | |
| 2009/0320894 A1 | * | 12/2009 | Angiuli | C03C 17/25 136/244 |

OTHER PUBLICATIONS

Ortega et al. "Structural and electrochemical studies of WO3 films deposited by pulsed spray pyrolysis", Sol. Energy Mater. Sol. Cells, vol. 90, pp. 2471-2479 (2006).

Sadale et al. "Photoelectrochemical and physical properties of tungsten trioxide films obtained by aerosol pyrolysis", Mater. Res. Bull., vol. 43, pp. 1472-1479 (2008).

Sivakumar et al. "Preparation and characterization of spray deposited n-type WO3 thin films for electrochromic devices", Mater. Res. Bull., vol. 39, pp. 1479-1489 (2004).

* cited by examiner

*Primary Examiner* — Lauren R Colgan
(74) *Attorney, Agent, or Firm* — Caesar Rivise, PC

(57) ABSTRACT

A precursor solution adapted to provide a metal oxide film, includes: (a) at least one additive selected from a viscosity enhancer, a base, an acid and a wetting agent; (b) structural promoter ions selected from Mn, Ni, Co, Ir, Ru, Cr, Mo, W, Ta, Nb, V, Mo, Zr, V and Ti ions; and (c) at least one solvent. A method for preparing a metal oxide film includes: (a) providing a substrate; and (b) depositing on the substrate the precursor solution of the invention. Metal oxides films, electrochromic devices containing the films and methods for making them are also disclosed.

5 Claims, 7 Drawing Sheets

ELECTROCHROMIC MATERIALS AND FABRICATION METHODS

BACKGROUND OF THE INVENTION

1. Field of Invention

This invention relates generally to the preparation of transition metal oxide films. More particularly, the invention relates to the deposition of an electrochemically active transition metal oxide film onto the surface of a glass sheet by a wet chemical process such as sol-gel, electroplating, electroless plating, and spray pyrolysis.

2. Description of Related Art

The term "electrochromic" refers to the ability of certain materials to change color when an electrical potential is applied. In the 1930s, bulk tungsten oxide was first shown to change color electrochemically. Electrochromic switchable rearview mirrors based on tungsten oxide and viologens were developed successfully in the 1980s and are used widely in automobiles today. In the 1990s, development of electrochromic thin films for architectural glazing was initiated by several companies, although their efforts have not yet resulted in widespread applications in the building industry primarily because of the high cost and performance issues.

There are different types of electrochromic materials and structures which are used for different application purposes. Inorganic and substantially inorganic electrochromic thin film materials, superimposed in a multilayer structure, are typically used for architectural window applications because of a high durability with respect to heat and ultraviolet radiation. Although electrochromic rearview mirrors for automobiles based on liquid or polymeric electrochromes have been successfully marketed, more widespread use of electrochromic devices in applications such as eyewear, display, architectural windows and skylights, etc. have not been realized, mainly because of the high cost, low cycling durability, and inadequate switching range and speed.

Electrochromic (EC) devices are comprised of multiple layers of coatings (current collectors, redox electrodes, and an electrolyte layer), akin to the structure of a battery. EC devices designed for architectural applications must have superb durability with respect to resistance to solar radiation (including UV) in colored (dark) and bleached (clear) states, and additionally need to exhibit the ability to change color repeatedly over an operating lifetime of 20 or more years. FIG. 4 shows a schematic of typical EC device structure useful for large-area window applications. The device includes substrate 10, a first transparent conductor 12, cathodic electrochromic layer 14, electrolyte or ion conductor 16, anodic layer 18 and a second transparent conductor 20.

EC devices work by intercalation and deintercalation of mobile ions; the mechanism is explained below using a model system with tungsten oxide (cathodic, or colors upon reduction) and vanadium oxide (anodic) layer:
(Transparent) $WO_3+xM^++xe^- \leftrightarrow M_xWO_3$ (Colored)
$V_2O_5 \leftrightarrow M_xV_2O_5+xM^++xe^-$ (both states of vanadium oxide are lightly colored), $M^+=H^+$, $Li^+$, $Na^+$, $K^+$, and $e^-$ denotes electrons.

If the anodic layer also colors when it is oxidized, then it is called a complimentary coloring material. Some examples of complimentary materials that can be used with tungsten oxide are iridium oxide and nickel oxide.

Most electrochromic devices include an ion storage material that operates in conjunction with an electrochromic oxide film and enables ions to move repeatedly back and forth in order to evoke a reversible transmission modulation. The ion storage film is referred to as the "counter electrode" of the device. A counter electrode balances the charge shuttled from the active electrochromic (EC) film through ionic conductor and the electron insulator electrolyte. Good cycling stability within the operational voltage and temperature range of the ECDs is another requirement of the counter electrode. The requirements on this material are different depending on whether the device is designed for reflectance modulation or transmittance modulation. The reflecting device can include a mirror-like or scattering layer that obscures the ion storage layer, and only the electrochemical properties of the ion storage film are of interest. In a transmitting device, on the other hand, both the electrochemical and optical properties of the ion storage film are of crucial importance. Under all conditions, the ion intercalation/deintercalation should take place via a fully reversible electrochemical reaction. The choice of ion storage material is more critical for transparent devices, like electrochromic windows (ECWs) than for reflecting devices. One possibility is the use of an electrochromic ion storage layer (active counter electrode) complementary to the selected electrochromic material (for example an anodically coloring film operating in combination with a $WO_3$ film). In complementary kind of ECDs, the counter electrodes are active, i.e. they color in their oxidized state, while the primary electrochromic electrode like $WO_3$ colors in its reduced state. This type of configuration needs compatible anodic and cathodic reaction rates.

Various different deposition techniques have been used to date to fabricate EC thin films. Among the most popular techniques are vacuum deposition techniques such as sputtering, thermal and electron beam evaporation, and chemical vapor deposition (CVD). These deposition techniques, especially for large-area applications, suffer from at least one of the following problems: i) complex and expensive vacuum system; ii) low deposition rate; iii) expensive source materials; iv) expensive maintenance; v) nonuniformity of the deposited films; and vi) low utilization rate.

Alternatively, wet deposition techniques have also been used. Sol-gel techniques have been used to deposit some of the layers within an EC device. While sol-gel is a cost-effective technique, it suffers from drawbacks such as slow throughput and significant chemical solution waste.

Besides sol-gel, electrodeposition also is used to deposit both the primary and secondary EC layers. Although electrodeposition can be inexpensive, it is difficult to deposit mixtures of metal oxides, and multilayers, as well as to maintain good film uniformity across large-area devices.

Besides sol-gel and electrodeposition, spray pyrolysis (SP) has been used to produce single EC layers at different substrate temperatures. The EC layers formed by SP might be exposed to a heat treatment after the SP process—which leads to increased time and cost. To fabricate EC devices, single EC layers are usually laminated together via a polymer ion conductor or an organically modified electrolyte (ormolyte). Lamination increases the production complexity and hence cost, as well as adding additional weight which can be substantial if glass substrates are utilized within the EC devices. Furthermore, organic or ormolyte ion conductors increase the risk of degradation when exposed to heat and/or ultraviolet radiation.

Transition metal oxides, such $V_2O_5$, $MoO_3$, $WO_3$, $CoO$, $NiO$, $TiO_2$, $Ta_2O_5$, $Nb_2O_5$, etc., are semiconductor materials that have been extensively studied for EC windows application. Electrochromics operating in a transmissive mode require stable conductive materials with high transmittance of the visible light and good electrical transport properties, for switching between the colored and bleached states. No matter what technique is used for deposition, the selection of the deposition parameters significantly influences the structure, morphology and composition of the resulting film with direct consequences on the optical and electrical properties of the layer. Films with high porosity or extensive grain boundaries are preferred, as they support the rapid ion insertion-extraction, which translates into enhanced coloring efficiency and fast switching rates between the clear and dark states. Reproducibility in terms of stoichiometry, thickness, porosity, composition and crystallinity over a large area is required in order to ensure high performance of the electrochromic devices.

Thin films of transition metal oxides have been grown by various techniques including evaporation, thermal reactive evaporation, sputtering, electrodeposition, anodization, physical vapor deposition, chemical vapor deposition, sol-gel deposition, spray pyrolysis, dip coating, spin coating, and flow coating.

Spray pyrolysis is a versatile deposition method because it allows the use of inexpensive precursor materials, good control of layer stoichiometry, and large-area coatings can be obtained by using low-cost equipment, in low energy consuming conditions. In spray pyrolysis, the deposition rate, thickness and uniformity of the films are the consequence of nucleation and crystal growth processes which are mainly influenced by the deposition temperature and precursor solution concentration. On the other hand, the precursor type and carrier gas type and pressure influence the solvent evaporation rate and the chemical reactions within the aerosol droplets.

Different spraying solutions have been prepared by using different precursors. For example, aqueous solution of ammonium tungstate $((NH_4)_2WO_4)$ was used by Sivakumar et al. (*Mater. Res. Bull.* 2004, 39, 1479), and aqueous solution of peroxotungstate was used by Sadale et al. (*Mater. Res. Bull.* 2008, 43, 1472). $WCl_6$ dissolved in N, N'-dimethylformamide was used by Ortega et al. (*Sol. Energy Mater. Sol. Cells* 2006, 90, 2471). However, to the best of our knowledge, optically smooth, haze-free transition metal oxide films for electrochromic applications have not been obtained so far using the spray pyrolysis method due to the inclusion of large-size particles, high surface roughness, and/or cracks in the resultant films.

In addition, in the prior art, compressed dry air or nitrogen has been used as the carrier gas for spray pyrolysis of transition metal oxide films. The problem is that both air and nitrogen can cause the precursor solution to form precipitates in the precursor solution and/or onto the tube walls during the spray pyrolysis process, and result in low deposition rate or even no deposition at all.

Therefore, there is a need for improved methods of preparing metal oxide films for electrochromic applications, which methods address one or more of the foregoing problems with prior methods.

All references cited herein are incorporated herein by reference in their entireties, including but not limited to U.S. Pat. No. 8,780,432 and U.S. Application No. 61/800,708, filed Mar. 15, 2013.

BRIEF SUMMARY OF THE INVENTION

Accordingly, in a first aspect of the invention, there is provided a precursor solution adapted to provide a metal oxide film, said precursor solution comprising: (a) at least one additive selected from the group consisting of a viscosity enhancer, a base, an acid and a wetting agent; (b) structural promoter ions selected from the group consisting of Mn, Ni, Co, Ir, Ru, Cr, Mo, W, Ta, Nb, V, Mo, Zr, V and Ti ions; and (c) at least one solvent.

A second aspect of the invention comprises a method for preparing a metal oxide film, said method comprising: (a) providing a substrate; and (b) depositing on the substrate the precursor solution of the invention so as to provide the metal oxide film on the substrate.

In certain embodiments of the second aspect of the invention, the depositing is conducted under an inert atmosphere using at least one inert gas as a carrier gas and as an ambient gas.

A third aspect of the invention is a metal oxide film prepared by the method of the second aspect of the invention.

A fourth aspect of the invention is an electrochromic device comprising a metal oxide film prepared by the method of the second aspect of the invention.

In certain embodiments, an electrochromic device of the invention comprises a metal oxide film, wherein the metal oxide film comprises: (a) at least one additive selected from the group consisting of a viscosity enhancer, a base, an acid and a wetting agent; and (b) at least one oxide of an metal selected from the group consisting of Mn, Ni, Co, Ir, Ru, Cr, Mo, W, Ta, Nb, V, Mo, Zr, V and Ti, wherein the metal oxide film is nanocrystalline and adapted for fully reversible electrochromic switching.

A fifth aspect of the invention comprises a method for preparing a metal oxide film, said method comprising: (a) providing a substrate; and (b) depositing on the substrate a precursor solution so as to provide the metal oxide film on the substrate, wherein the depositing is conducted under an inert atmosphere using at least one inert gas as a carrier gas and as an ambient gas.

BRIEF DESCRIPTION OF SEVERAL VIEWS OF THE DRAWINGS

The invention will be described in conjunction with the following drawings wherein.

DETAILED DESCRIPTION OF PREFERRED EMBODIMENTS OF THE INVENTION

Figure 1A:
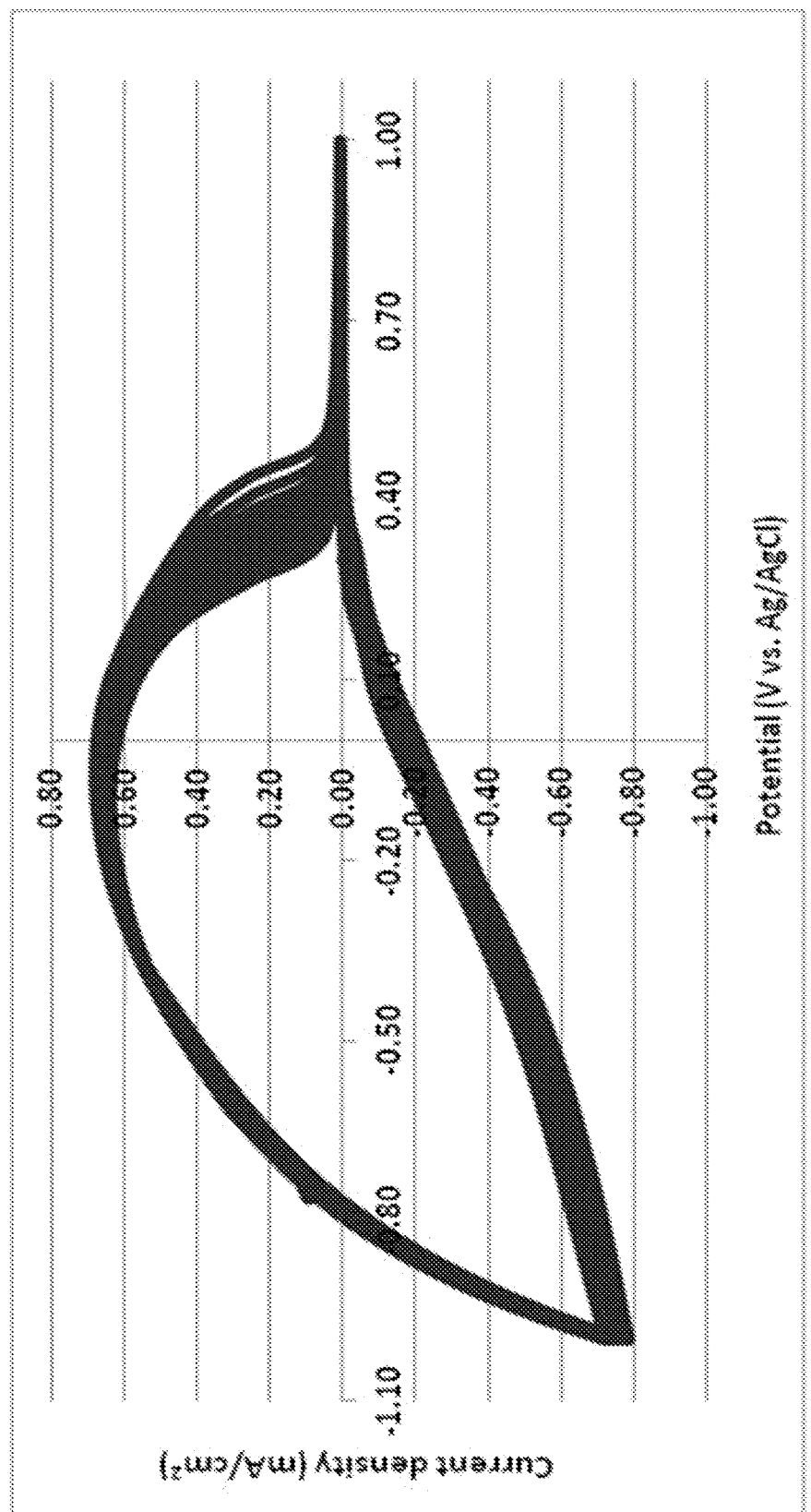
FIG. 1A is a plot of current density against potential of a film of Example 1.
Figure 1B:
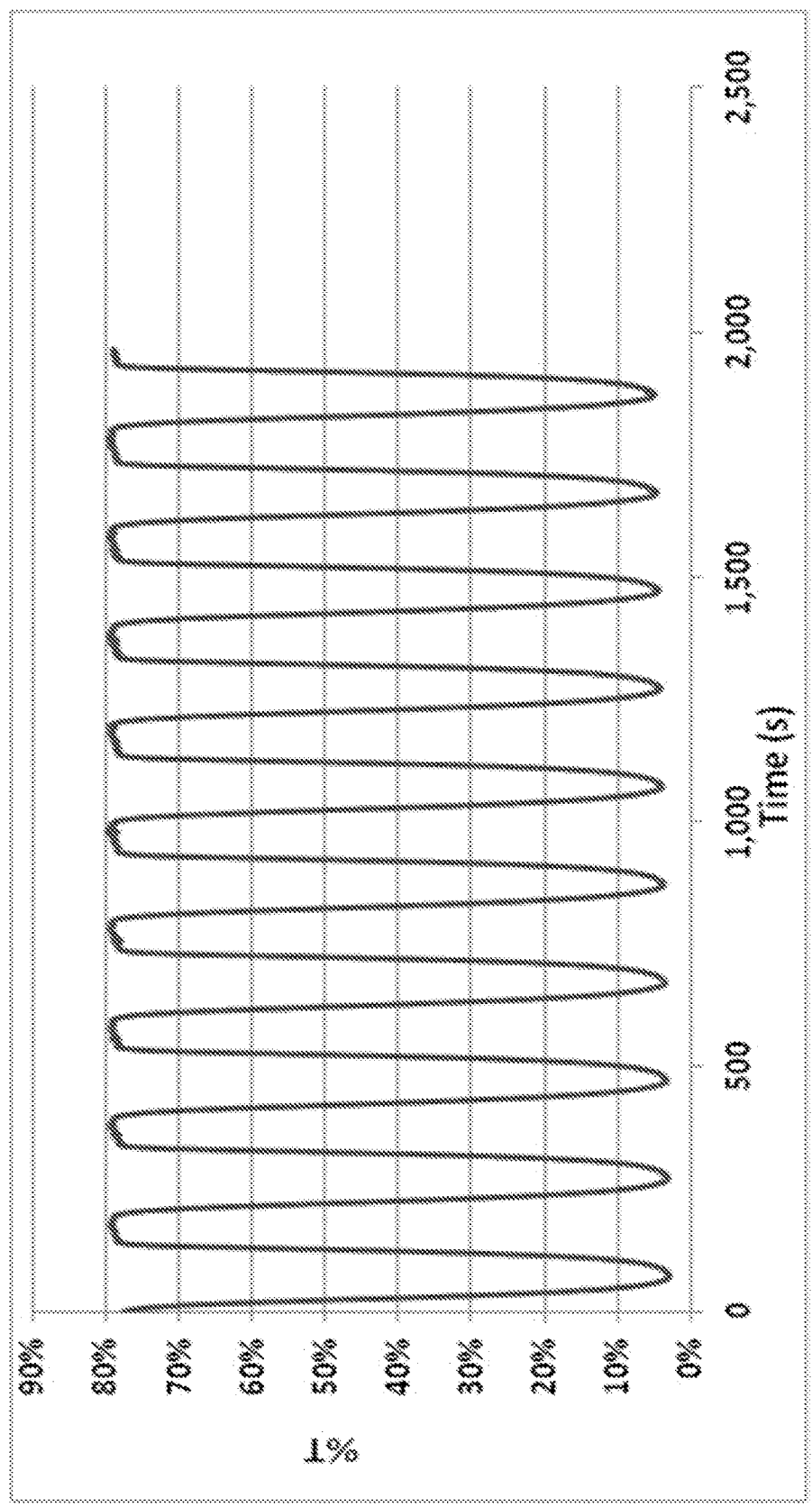
FIG. 1B is a plot of percent transmittance against cycling time of a film of Example 1.
Figure 2A:
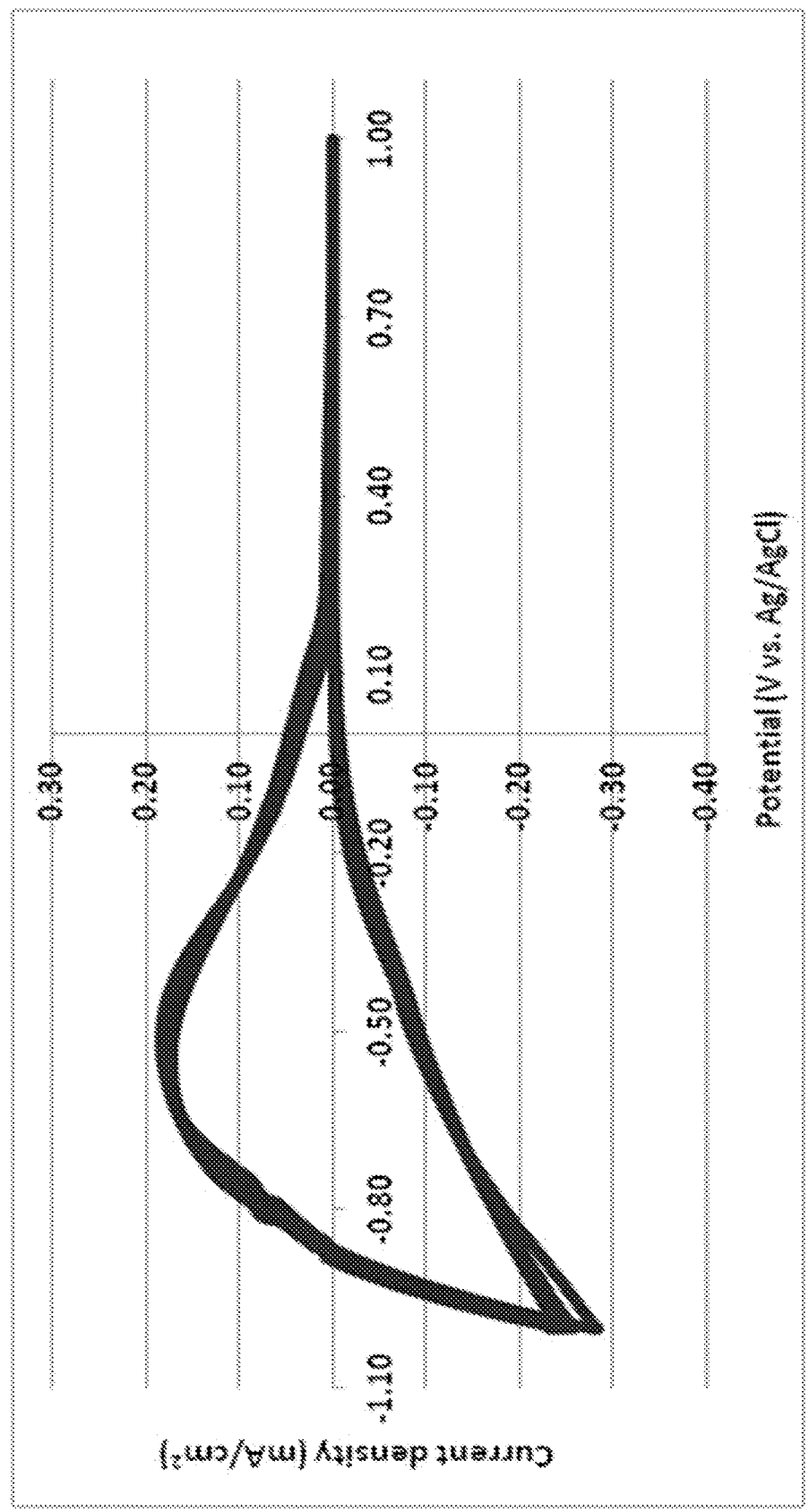
FIG. 2A is a plot of current density against potential of a film of Example 2.
Figure 2B:
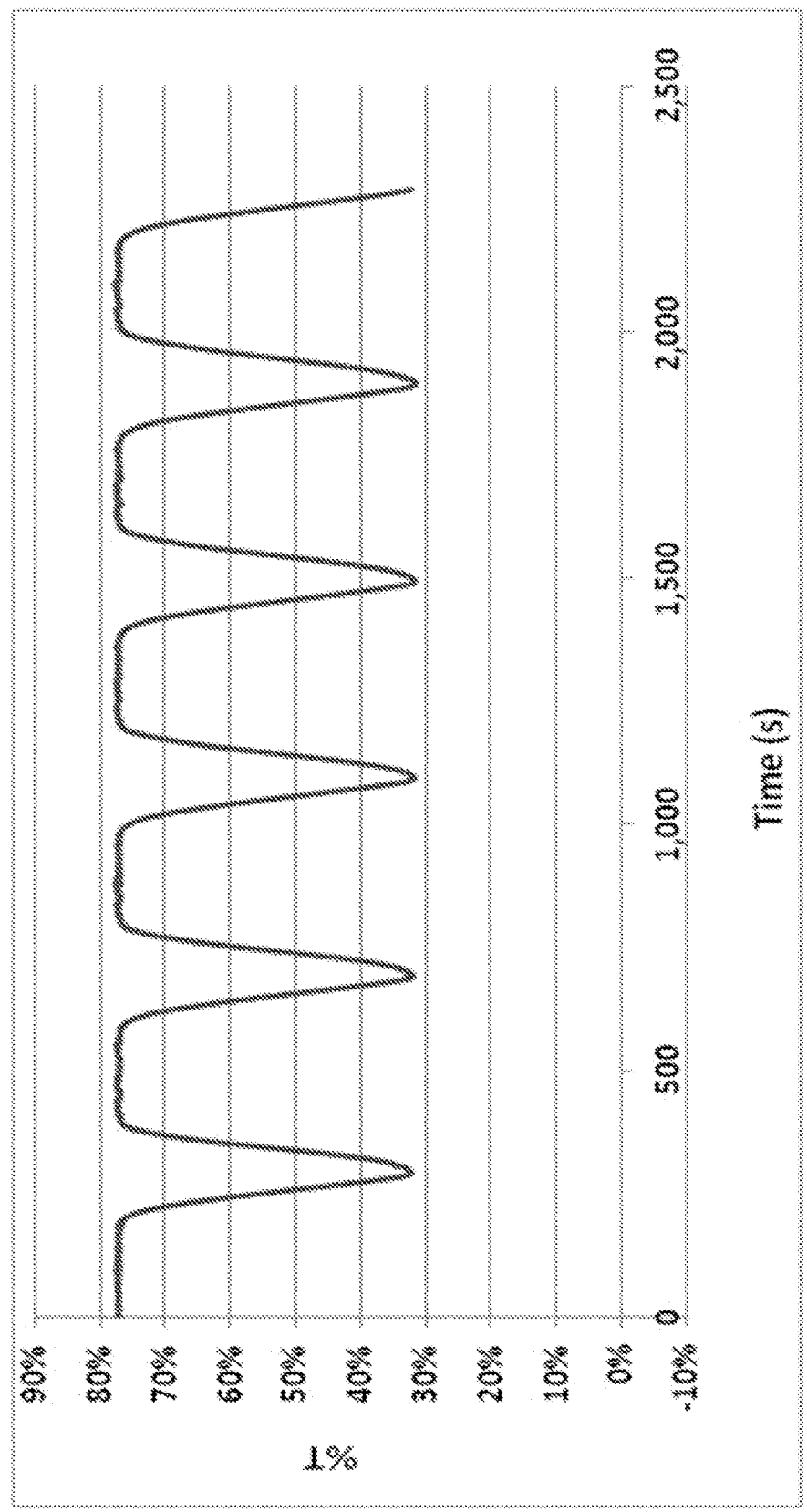
FIG. 2B is a plot of percent transmittance against cycling time of a film of Example 2.
Figure 3A:
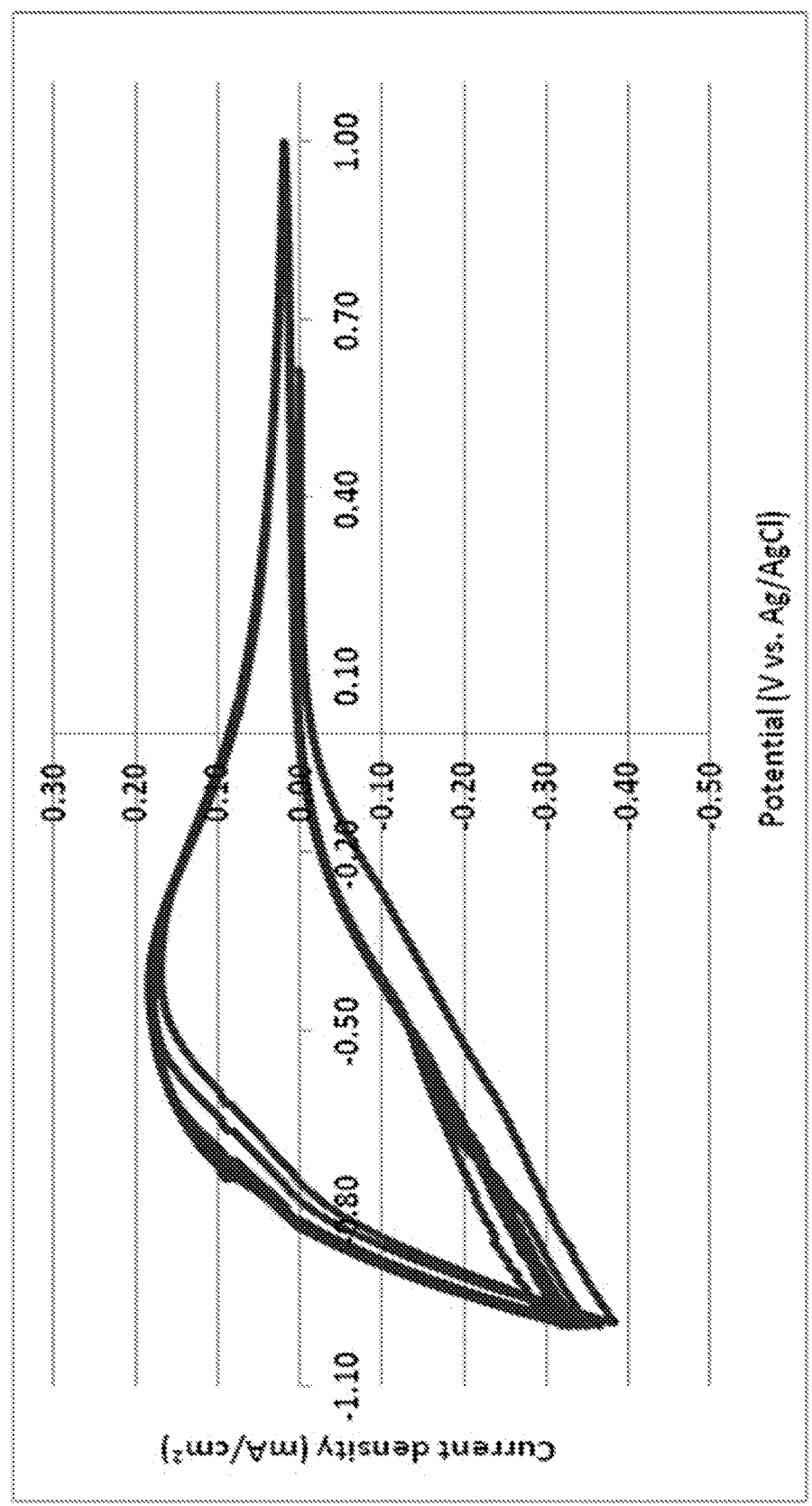
FIG. 3A is a plot of current density against potential of a film of Example 3.
Figure 3B:
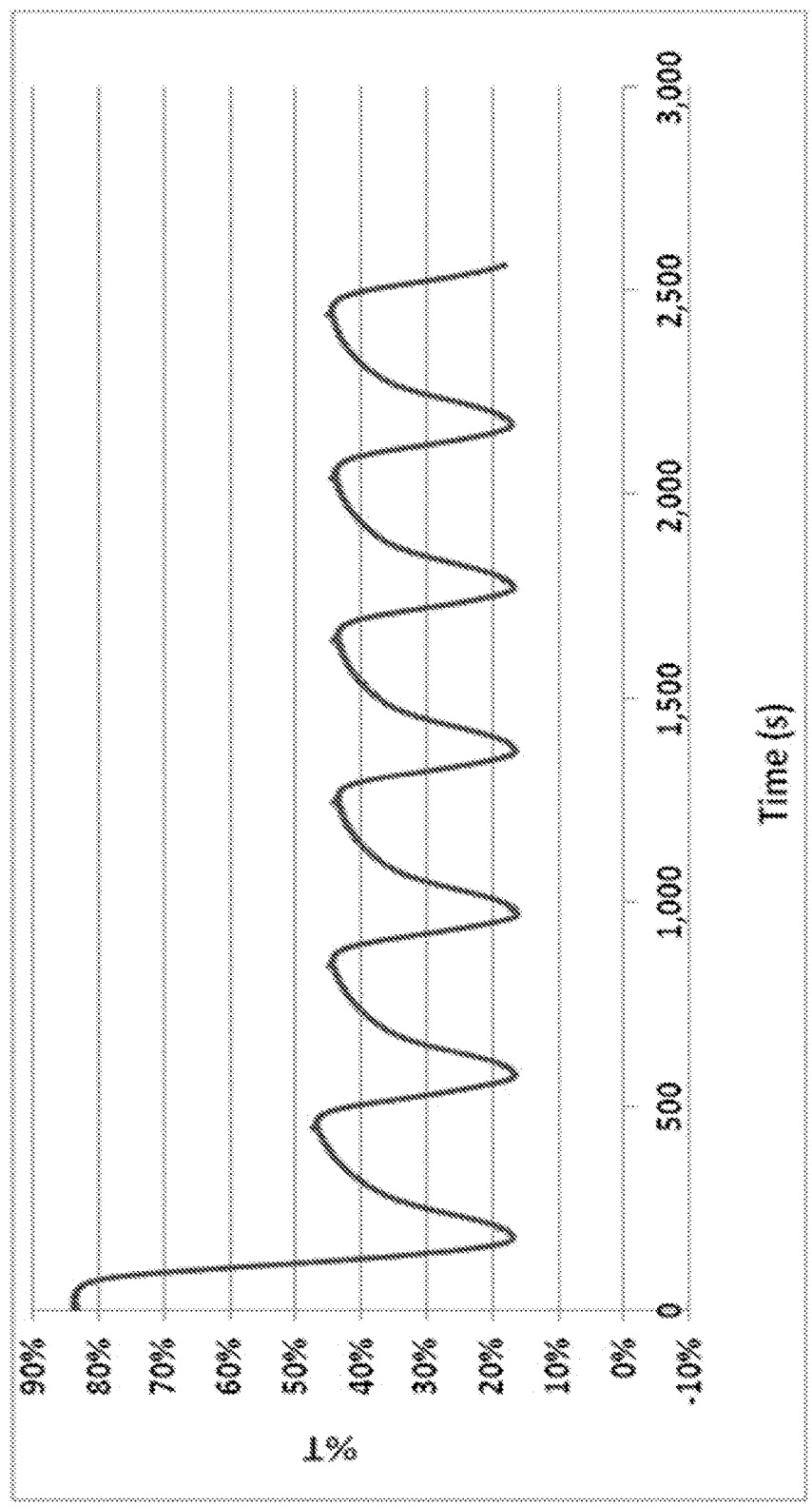
FIG. 3B is a plot of percent transmittance against cycling time of a film of Example 3.
Figure 4:
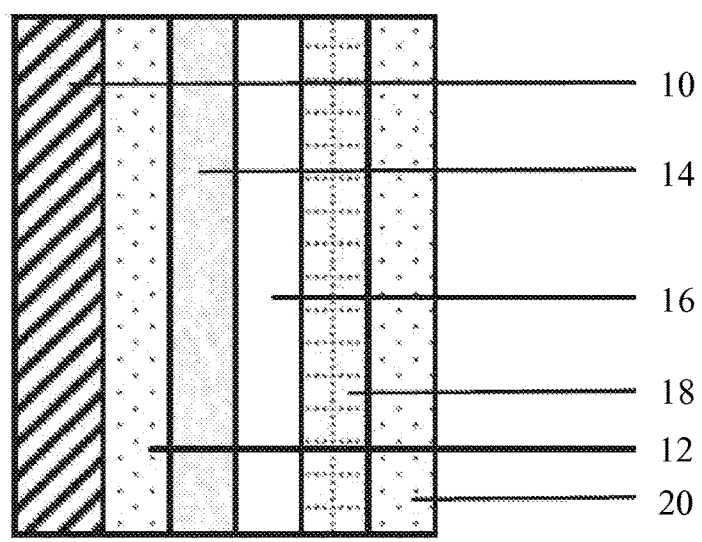
FIG. 4 is a schematic view of a conventional electrochromic device structure.

The invention provides improved transition metal oxide precursor solutions for preparing electrochromic devices (ECDs) and materials with improved properties relative to conventional ECDs and materials, including one or more of higher switching range, speed, and cycling durability, as well as minimized light scattering, haze, pinholes, and electrical shorts. The invention further provides a process for forming such ECDs and materials at a reduced cost of manufacturing and increased throughput.

The invention is based in part on the surprising discovery by the inventors that the modification of transition metal oxide precursor solutions with certain additives drastically reduces the sensitivity of said solutions to ambient moisture and inhibits particle formation during dip coating, spin coating, roll coating, spray coating, electroplating, electroless plating, spray pyrolysis, and flow coating.

Thus, a first aspect of the invention comprises a precursor solution adapted to provide a metal oxide film, said precursor solution comprising: (a) at least one additive selected from the group consisting of a viscosity enhancer, a base, an acid and a wetting agent; (b) structural promoter ions selected from the group consisting of Mn, Ni, Co, Ir, Ru, Cr, Mo, W, Ta, Nb, V, Mo, Zr, V and Ti ions; and (c) at least one solvent.

Additives are selected based on their ability to improve the properties of the precursor solution and/or metal oxide film formed therefrom. It is preferred that additives reduce the precursor solution's sensitivity to ambient moisture. It is also preferred that the additives provide the resulting metal oxide film that are nanocrystalline and/or adapted for fully reversible electrochromic switching.

Suitable additives include but are not limited to (a) Viscosity enhancers, e.g., poly(vinylacetate), poly(ethylene glycols), or paraffins, (b) Bases, e.g., ammonium hydroxide, methylamine, ethylamine, 2-aminoethanol, diethanolamine, and ethylenediamine; (c) Acids, e.g., acetic acid, propionic acid, oxalic acid, hydrochloric acid, nitric acid, and phosphoric acid; and (d) Wetting agents, e.g., sodium dodecyl sulfate, hexadecyltrimethylammonium bromide, Brij® 30 (polyethylene glycol dodecyl ether), Tween 80 (polyoxyethylene derivative of sorbitan), and Triton X-100 (polyoxyethylene mono(octylphenyl) ether). These additives can be used singly or in combinations of two or more.

Suitable solvents for the precursor solution include but are not limited to ethanol, isopropanol, methanol and water.

Suitable sources of lithium include but are not limited to lithium carbonate, lithium acetate, lithium hydroxide, and lithium trifluoromethanesulfonate ($LiCF_3SO_3$).

Suitable sources of nickel include but are not limited to nickel(II) acetate, nickel(II) chloride, nickel(II) acetylacetonate, nickel(II) carbonate hydroxide.

Suitable sources of manganese include but are not limited to manganese (III) acetylacetonate, manganese (II) carbonate, manganese (II) chloride, manganese(II,III) oxide, manganese (II) acetate, manganese (III) acetate.

Suitable sources of cobalt include but are not limited to cobalt(III) acetylacetonate, cobalt(II) carbonate, cobalt(II) chloride, cobalt(II,III) oxide, cobalt(II) stearate.

Suitable sources of iridium include but are not limited to iridium(III) acetylacetonate, iridium(III) chloride, iridium (IV) oxide.

Suitable sources of ruthenium include but are not limited to ruthenium(III) acetylacetonate, ruthenium(III) chloride, ruthenium(IV) oxide, ruthenium(III) iodide.

Suitable sources of tungsten include but are not limited to tungsten (VI) chloride, tungsten(VI) oxide, tungstic acid, peroxotungstic acid, ammonium tungstate, ammonium metatungstate.

Suitable sources of tantalum include but are not limited to tantalum(V) chloride, tantalum(V) ethoxide, tantalum(V) oxide, tantalum(V) iodide.

Suitable sources of niobium include but are not limited to niobium(III) acetylacetonate, niobium(V) chloride, niobium (V) ethoxide, niobium(IV) ethylhexanoate, niobium(V) oxide.

Suitable sources of titanium include but are not limited to titanium(IV) butoxide, titanium(IV) isopropoxide, titanium (IV) chloride, titanium(IV) oxide, peroxotitanic acid, titanium(IV) oxysulfate.

Suitable sources of vanadium include but are not limited to vanadium(III) acetylacetonate, vanadium(III) chloride, vanadium(V) oxide.

Suitable sources of zirconium include but are not limited to zirconium(IV) acetylacetonate, zirconium(IV) t-butoxide, zirconium(IV) carbonate, zirconium (IV) chloride, zirconium(IV) ethoxide, zirconium(IV) oxide, zirconium(IV) i-propoxide.

A second aspect of the invention comprises a method for preparing a metal oxide film, said method comprising: (a) providing a substrate; and (b) depositing on the substrate the precursor solution of the invention so as to provide the metal oxide film on the substrate.

The deposition step is preferably conducted under an inert atmosphere using at least one inert gas as a carrier gas and as an ambient gas. The prior art use of compressed dry air or nitrogen as the carrier gas for spray pyrolysis of transition metal oxide films can cause the precursor solution to form precipitates in the precursor solution and/or on the tube walls during the spray pyrolysis process, and result in low deposition rates or even no deposition at all. The invention circumvents this problem by using a completely inert gas as the carrier gas and as the ambient gas. Suitable inert gases include but are not limited to He, Ar, Ne, Kr, and Xe.

The deposition step preferably comprises a wet deposition technique for forming thin films, and more preferably, a sol-gel or spray pyrolysis technique or other wet deposition technique, with sol-gel being most preferred. Conventional sol-gel and spray pyrolysis and other wet deposition techniques can be modified in accordance with the teachings herein to provide the inventive films.

The precursor solution is applied to a substrate to provide a coated substrate. The substrate is preferably a conductive glass, such as 3-mm-thick soda-lime glass coated with fluorine-doped tin oxide, or tin-doped indium oxide.

In an optional additional step of the method, the coated substrate is calcined to provide the electrochromic thin film. The calcining step is a heating step that is preferably conducted in an ambient atmosphere at a temperature of 250-450° C. or 325-400° C. or about 350° C. Calcining is preferably conducted for 0.1-25 minutes or 12-18 minutes or about 15 minutes in, e.g., a muffle furnace.

A third aspect of the invention is a metal oxide film, which can be prepared by the method of the second aspect of the invention. The metal oxide film is preferably a thin film suitable for use in electrochromic applications.

The expression "thin film" as used defined herein refers to a layer (or a composite of multiple layers) of material ranging in thickness from fractions of a nanometer to 10 micrometers. The thin films of the invention preferably have a thickness from 10-1000 nm, or 100-400 nm.

The metal oxide film comprises at least one additive selected from the group consisting of a viscosity enhancer, a base, an acid and a wetting agent, and at least one oxide of a metal selected from the group consisting of Mn, Ni, Co, Ir, Ru, Cr, Mo, W, Ta, Nb, V, Mo, Zr, V and Ti. The metal oxide film is preferably nanocrystalline and adapted for fully reversible electrochromic switching. As used herein, a nanocrystalline film is defined as a film with grains that are crystalline and nanometers in size.

Conventional sol-gel derived transition metal oxide films, such as $V_2O_5$, $MoO_3$, $WO_3$, $CoO$, $NiO$, $TiO_2$, $Ta_2O_5$, and $Nb_2O_5$, are amorphous after calcination at temperatures of 250° C. or lower, and show excellent electrochromic properties such as fast switching, high reversibility and high coloration efficiency. However, after calcination at temperatures of 350° C. or higher, the conventional metal oxide films become polycrystalline and lose their reversibility in optical switching. It is believed that a significant portion of the open channels for the $H^+$ and/or $Li^+$-ion conduction in the amorphous transition metal oxide films are narrowed down or closed up during uncontrolled crystallization, and so proton or lithium ion insertion and extraction would not be fully reversible anymore.

This invention overcomes this problem by incorporating additives into the sol-gel precursor solutions. The additives include sodium and/or lithium salts (sodium salts are preferred because of lower cost), such as sodium or lithium carbonate, sodium or lithium acetate, sodium or lithium hydroxide, sodium or lithium trifluoromethanesulfonate, sodium or lithium acetylacetonate, sodium or lithium citrate. The additives can also include small organic molecules functioning as chelators, such as aminoethanol, ethylenediamine, oxalic acid, citric acid, and ascorbic acid. The additives can inhibit the crystal growth during high-temperature calcination, and result in the formation of nanocrystalline transition metal oxide films that retain the reversible electrochromic properties.

A fourth aspect of the invention is an electrochromic device comprising a metal oxide film, wherein the metal oxide film comprises: (a) at least one additive selected from the group consisting of a viscosity enhancer, a base, an acid and a wetting agent; and (b) at least one oxide of an metal selected from the group consisting of Mn, Ni, Co, Ir, Ru, Cr, Mo, W, Ta, Nb, V, Mo, Zr, V and Ti, wherein the metal oxide film is nanocrystalline and adapted for fully reversible electrochromic switching.

A fifth aspect of the invention comprises a method for preparing a metal oxide film, said method comprising: (a) providing a substrate; and (b) depositing on the substrate a precursor solution so as to provide the metal oxide film on the substrate, wherein the depositing is conducted under an inert atmosphere using at least one inert gas as a carrier gas and as an ambient gas.

The invention will be illustrated in more detail with reference to the following Examples, but it should be understood that the present invention is not deemed to be limited thereto.

EXAMPLES

Example 1

Firstly, prepare 0.24 M $TiCl_4$ solution in ethanol with acetylacetone stabilizer: 8.57 g acetylacetone is added into 173 mL ethanol, and then 10 g $TiCl_4$ is added into the solvent. 460 mg 2-aminoethanol is added into 15 mL ethanol, and then added into the above $TiCl_4$ solution. Heat on a hotplate set at 125° C. for about 10 min. Cleaning of fluorine-doped tin oxide coated glass substrates (15 Ohms/square) was done by degreasing with alkaline detergent, rinsing with deionized water and finally ultrasonically cleaning in ethanol, followed by drying in compressed air flow. For obtaining the aerosols, a pneumatic atomizer was used. During deposition, the substrate temperature was kept at 220° C. The carrier gas is argon with a flow rate of 30 liter per minute. The spraying distance was kept at 3 mm. A run with one fill of 50 mL precursor solution took about 17 min, and resulted in 180 nm thick $TiO_2$ films.

The optical switching characteristics of a thus-obtained film were evaluated by cycling it on a potentiostat in a three-electrode electrochemical cell at 20 mV/s between −1.5 V and +1 V vs. AgCl/Ag (Electrolyte solution: 1 M $LiClO_4$ in propylene carbonate). The transmittance of the film was measured in situ as a function of cycling time, using a Si photo-detector, which is sensitive to photons in the wavelength range of 400-1100 nm. The transmittance of the thin film switches between about 85% and about 35%. The thin film shows high charge capacity (about 40 $mC/cm^2/\mu m$) and excellent cyclability with negligible degradations seen after at least about 100 cycles.

Example 2

Dissolution of 13 g of tungsten metal powder in a mixture of 80 ml of 30% $H_2O_2$ and 8 mL of deionized water yielded a colorless solution of peroxotungstic acid. The reaction being exothermic was conducted between 0 and 10° C. The clear solution obtained upon filtration was refluxed at 55° C. for 12 h after addition of 80 ml of glacial acetic acid. The resulting pale yellow solution was vacuum dried at 60° C. to obtain a yellow flaky solid of acetylated peroxotungstic acid. The solid material (10 g) was dissolved in 30 mL of ethanol by heating at ~50° C., resulting in a clear and bright yellow solution of PTA. Spin coat a conductive glass substrate (coated with F-doped $SnO_2$, 15 ohms/square) using this precursor solution at 2000 rpm, and heat treat in ambient atmosphere in a muffle furnace at 150° C. for 30 min, obtaining a $WO_3$ thin layer of 180 nm in thickness. Repeat the spin coating process one more time.

The optical switching characteristics of a thus-obtained film (180 nm) were evaluated by cycling it on a potentiostat in a three-electrode electrochemical cell at 20 mV/s between −1 V and +1 V vs. AgCl/Ag (Electrolyte solution: 1 M $LiClO_4$ in propylene carbonate). The transmittance of the film was measured in situ as a function of cycling time, using a Si photo-detector, which is sensitive to photons in the wavelength range of 400-1100 nm. The transmittance of the thin film switches between about 80% and about 5%. The thin film shows high charge capacity (about 80 $mC/cm^2/\mu m$) and excellent cyclability with negligible degradations seen after at least about 100 cycles, as shown in the figures below.

Example 3

The procedure for the synthesis of $WO_3$ films is the same as shown in Example 2 except that the calcination was carried out at 350° C. The electrochromic switching of the resultant $WO_3$ film is irreversible because it shows a residual blue color in the bleached state after the first cycle, as shown in the figures below.

Example 4

The PTA solution is synthesized as described in Example 2. To the PTA solution, 2-aminoethanol was added in terms of 4 wt. % (with respect to the weight of the sol), and sodium citrate was added in terms of 0.3/1 for the Na/W atomic ratio. Some deionized water was added to help dissolve the sodium acetate.

The procedure for the synthesis of $WO_3$ films is the same as shown in Example 2 except that the modified precursor solution was used instead and the calcination was carried out at 350° C. The electrochromic switching of the resultant $WO_3$ film is fully reversible, as shown in the figures below.

While the invention has been described in detail and with reference to specific examples thereof, it will be apparent to one skilled in the art that various changes and modifications can be made therein without departing from the spirit and scope thereof.

What is claimed is:

1. An electrochromic device comprising a metal oxide film, wherein the metal oxide film comprises:
   at least one additive selected from the group consisting of a viscosity enhancer, a base, an acid and a wetting agent; and
   at least one oxide of a metal selected from the group consisting of Mn, Ni, Co, Ir, Ru, Cr, Mo, W, Ta, Nb, Zr, V and Ti,
   wherein the metal oxide film is prepared by a method comprising:
   (a) providing a substrate;
   (b) providing a precursor solution comprising: (i) the at least one additive, (ii) at least one solvent and (iii) structural promoter ions selected from the group consisting of Mn, Ni, Co, Ir, Ru, Cr, Mo, W, Ta, Nb, Zr, V and Ti ions; and
   (c) depositing the precursor solution on the substrate so as to provide the metal oxide film, wherein the depositing comprises spray pyrolysis under an inert atmosphere using at least one inert gas as a carrier gas and as an ambient gas, such that the metal oxide film is optically smooth, haze-free, nanocrystalline and effective for fully reversible electrochromic switching.

2. The electrochromic device of claim 1, wherein the at least one additive is at least one member selected from the group consisting of poly(vinylacetate), poly(ethylene glycol), paraffin, ammonium hydroxide, methylamine, ethylamine, 2-aminoethanol, diethanolamine, ethylenediamine, acetic acid, propionic acid, oxalic acid, hydrochloric acid, nitric acid, phosphoric acid, sodium dodecyl sulfate, hexadecyltrimethylammonium bromide, polyethylene glycol dodecyl ether, a polyoxyethylene derivative of sorbitan and polyoxyethylene mono(octylphenyl) ether.

3. The electrochromic device of claim 1, wherein the at least one additive comprises sodium or lithium.

4. The electrochromic device of claim 3, wherein the at least one additive is at least one member selected from the group consisting of sodium carbonate, lithium carbonate, sodium acetate, lithium acetate, sodium hydroxide, lithium hydroxide, sodium trifluoromethanesulfonate, lithium trifluoromethanesulfonate, sodium acetylacetonate, lithium acetylacetonate, sodium citrate and lithium citrate.

5. The electrochromic device of claim 1, wherein the at least one solvent is ethanol, isopropanol, methanol or water.

* * * * *